(12) United States Patent
Mestha et al.

(10) Patent No.: US 7,339,704 B2
(45) Date of Patent: Mar. 4, 2008

(54) METHOD FOR STANDARDIZING INPUT CMYK VALUES FOR CLUSTERED PRINTING ENVIRONMENTS

(75) Inventors: Lalit K. Mestha, Fairport, NY (US); Norman W. Zeck, Webster, NY (US); Kenneth J. Mihalyov, Webster, NY (US); Gaurav Sharma, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1050 days.

(21) Appl. No.: 10/465,457

(22) Filed: Jun. 19, 2003

(65) Prior Publication Data

US 2004/0257596 A1 Dec. 23, 2004

(51) Int. Cl.
- H04N 1/50 (2006.01)
- H04N 1/56 (2006.01)
- G06K 9/00 (2006.01)

(52) U.S. Cl. .................. 358/1.9; 358/504; 358/3.23; 382/162; 382/167

(58) Field of Classification Search ................. 358/1.9, 358/515, 518, 523, 520, 529, 3.06, 2.1, 3.23, 358/524–525, 504; 345/589–590, 596, 599, 345/431, 601–602, 604, 606; 382/162, 167, 382/300

See application file for complete search history.

(56) References Cited

U.S. PATENT DOCUMENTS

| | | |
|---|---|---|
| 5,416,890 A | 5/1995 | Beretta |
| 5,502,580 A | 3/1996 | Yoda et al. |
| 5,537,516 A | 7/1996 | Sherman et al. ............ 395/109 |
| 5,604,610 A | 2/1997 | Spaulding et al. |
| 5,611,030 A | 3/1997 | Stokes |
| 5,710,872 A | 1/1998 | Takahashi et al. |
| 5,719,956 A * | 2/1998 | Ogatsu et al. .............. 382/167 |
| 5,731,818 A | 3/1998 | Wan et al. |
| 5,739,927 A | 4/1998 | Balasubramanian et al. .......................... 358/518 |
| 5,748,858 A | 5/1998 | Ohtsuka et al. |
| 5,764,387 A * | 6/1998 | Yamada ..................... 358/525 |
| 5,872,898 A | 2/1999 | Mahy |
| 5,881,211 A * | 3/1999 | Matsumura ................. 358/1.9 |
| 5,960,110 A * | 9/1999 | Usami ........................ 382/167 |
| 5,987,167 A | 11/1999 | Inoue |
| 6,043,909 A | 3/2000 | Holub |
| 6,072,464 A | 6/2000 | Ozeki |

(Continued)

OTHER PUBLICATIONS

Abbreviated Journal Title: "Jsuanji Xuebao", Maozu Guo, et al. Chinese Journal of Computers, vol. 23. No. 8, Aug. 2000, pp. 819-823.

(Continued)

Primary Examiner—Kimberly Williams
Assistant Examiner—Charlotte M. Baker

(57) ABSTRACT

The present invention implements a CMYK to CMYK pre-transform in front of at least one printer to be clustered where the transform is designed to ensure that the printers addressed through the pre-transform have substantially identical output color for substantially identical input CMYK values. As one form of implementation a method is disclosed to build CMY to CMY 3D-LUTs and 1D-LUT for K using sensors in the field. Making use of a system LUT—CMY to CMY 3D-LUT and a K to K 1D-LUT—improves consistency and provides a coherent control strategy and a means to provide standardized input CMY and K values in a clustered environment so that single or multiple vendor DFEs see substantially identical CMYK values.

14 Claims, 4 Drawing Sheets

U.S. PATENT DOCUMENTS

| | | | |
|---|---|---|---|
| 6,151,135 | A * | 11/2000 | Tanaka et al. ............... 358/1.9 |
| 6,157,469 | A | 12/2000 | Mestha ....................... 358/504 |
| 6,157,735 | A | 12/2000 | Holub |
| 6,160,968 | A | 12/2000 | Noda |
| 6,344,902 | B1 | 2/2002 | Duke et al. ................. 358/1.9 |
| 6,377,366 | B1 * | 4/2002 | Usami ....................... 358/520 |
| 6,396,595 | B1 * | 5/2002 | Shimazaki ................. 358/1.9 |
| 6,628,822 | B1 | 9/2003 | Nakabayashi et al. |
| 6,636,628 | B1 | 10/2003 | Wang et al. |
| 6,678,068 | B1 | 1/2004 | Richter et al. |
| 6,870,636 | B2 | 3/2005 | Kulkarni |
| 6,947,163 | B2 | 9/2005 | Takemura |
| 7,024,034 | B2 | 4/2006 | Kim et al. |
| 7,090,417 | B2 | 8/2006 | Roztocil et al. |
| 7,180,632 | B2 | 2/2007 | Kanai et al. |
| 7,193,746 | B2 | 3/2007 | Kanai |
| 7,199,900 | B2 * | 4/2007 | Ogatsu et al. ............... 358/1.9 |
| 2003/0072016 | A1 * | 4/2003 | Dalrymple et al. .......... 358/1.9 |
| 2004/0196475 | A1 * | 10/2004 | Zeng et al. ................. 358/1.9 |

OTHER PUBLICATIONS

*"Sequential Linear Interpolation of Multi-Dimensional Functions"*, Allebach, et al., IEEE Trans on Image Processing, vol. 6, No. 9, Sep. 1997.

U.S. Appl. No. 09/487,587, filed Jan. 19, 2000, entitled "Iteratively Clustered Interpolation for Geometrical Interpolation of an Irregularaly Spaced Multidimensional Color Space" by Yao Rong Wang, et al.

Pending U.S. Appl. No. 09/566,291, filed May 5, 2000, entitled "On-Line Calibration System for a Dynamically Varying Color Marking Device", by Lalit K. Mestha et al.

R. Balasubramanian, "Refinement of Printer Transformations Using Weighted Regression", SPIE vol. 2658, pp. 334-340 (1996).

* cited by examiner

US 7,339,704 B2

METHOD FOR STANDARDIZING INPUT CMYK VALUES FOR CLUSTERED PRINTING ENVIRONMENTS

FIELD OF THE INVENTION

The present invention generally relates to the field of standardization of input CMY and K values in a clustered environment and, more particularly, to standards which help Digital Front Ends (DFE) in a clustered environment relate CMY and K values to device independent L*a*b* values so a common set of CMYK values are presented to the DFE for multiple underlying print engines in the cluster.

BACKGROUND OF THE INVENTION

Closed loop controls have been disrupting one industry after another as they become replacements for expensive precision parts or wide windows of latitude product/process design. Generally, they have been expanding their scale from individual subsystems to IOTs to complete production-printing systems. The use of closed loop control technology instead of precision parts or robust open loop system modeling and design captures the Moore's law cost curves of the electronics industry for electromechanical products. Applying distributed controls outside the Input Output Terminals (IOT) for predictable color, rendering all suitably equipped color IOTs "identically" and being able to render printed color over display devices accurately opens color cluster printing as an option to large in line color printers (e.g., xerographic and offset) and distributed printing as a viable alternative to the print and distribute business model of high quality graphic arts.

One of the largest barriers to cluster color printing's applicability is the inconsistency in color output. The gray balance technology (U.S. patent application Ser. No. 09/566291, entitled: "On-line calibration system for a dynamically varying color marking device") may still not be enough to achieve consistency in a distributed and clustered print environment.

The present invention is directed towards the elimination of such barriers by controlling the printers to have substantially identical output color responses for substantially identical input CMYK values.

BRIEF SUMMARY

The present invention implements a CMYK to CMYK pre-transform in front of at least one printer to be clustered where the transform is designed to ensure that the printers addressed through the pre-transform have substantially identical output color for substantially identical input CMYK values. As one form of implementation a method is disclosed to build CMY to CMY 3D-LUTs and 1D-LUT for K using sensors in the field. Making use of a system LUT—CMY to CMY 3D-LUT and a K to K 1D-LUT—improves consistency and provides a coherent control strategy and a means to provide standardized input CMY and K values in a clustered environment so that single or multiple vendor DFEs see substantially identical CMYK values.

BRIEF DESCRIPTION OF THE DRAWINGS

The preferred embodiments and other aspects of the invention will become apparent from the following detailed description of the invention when read in conjunction with the, accompanying drawings which are provided for the purpose of describing embodiments of the invention and not for limiting same, in which.

DETAILED SPECIFICATION

A method is disclosed to build CMY to CMY 3D-LUTs and 1D-LUT for K using sensors in the field. The present invention implements a CMYK to CMYK pre-transform in front of at least one printer to be clustered where the transform is designed to ensure that the printers addressed through the pre-transform have substantially identical output color for substantially identical input CMYK values. Making use of a system LUT—CMY to CMY 3D-LUT and a K to K 1D-LUT—in front of the gray balanced TRCs improves consistency and advantageously provides a coherent control strategy and a means to provide standardized input CMY and K values in a clustered environment so that single or multiple vendor DFEs see substantially identical CMYK values.

A CMYK to CMYK pre-transform is implemented in front of at least one printer to be clustered where the transform is designed to ensure that printers addressed through the pre-transform have substantially identical output color for substantially identical input CMYK values. Making use of a system LUT—CMYK to CMYK 4D-LUT—in front of the gray balanced TRCs improves consistency and advantageously provides a coherent control strategy and a means to provide input CMY and K values in a clustered environment so that single or multiple vendor DFEs see substantially identical CMYK values. As implemented in accordance with the techniques herein, the present invention help the DFEs in the clustered environment relate particular CMY and K values going into the printers to their device independent L*a*b* values. With this invention in place, DFE vendors can more easily construct 3D/4D profiles, such as ICC profiles, so as to perform color management functions more accurately.

Figure 1:
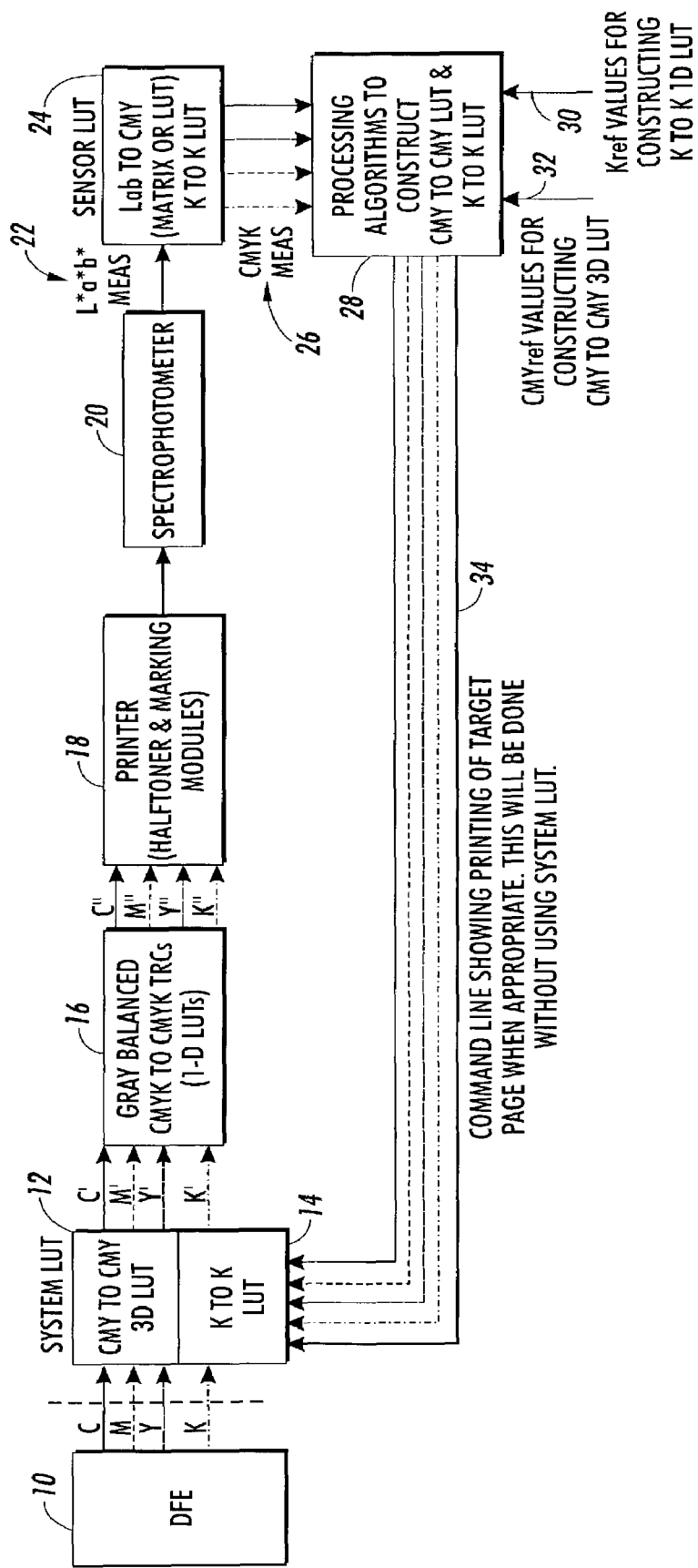
FIG. 1 illustrates use of system LUT [CMY to CMY 3D LUT and K to K 1D LUT] and sensor LUT [Lab to CMY 3D LUT, L* to K 1D LUT] as shown in the printer image path.

With reference now being made to FIG. 1, pre-transforms are implemented as a system LUT (3D CMY to CMY transform and a 1D K to K LUT or a 4D CMYK to CMYK LUT) and a sensor LUT (Lab to CMY and L* to K 1D LUT or a Spectra to CMYK LUT/transform). In FIG. 1, the Digital Front End (DFE), at 10, provides input CMYK values to a system LUT, shown collectively at 12 and 14, wherein a CMY-to-CMY 3D transformation and a K-to-K transformation occurs. The system LUT providing thereby a set of transformed CMYK values, denoted as C'M'Y' and K', to block 16 wherein a Gray Balanced CMYK-to-CMYK TRCs process occurs providing modified CMYK values, denoted as C"M"Y" and K", to a Halftoner and Marking Module 18 wherein the pixels will be printed on the paper as in any xerographic printing system. The data generated therefrom is read by spectrophotometer 20 wherein the measured L*a*b* values, at 22, are provided to sensor LUT

24. Therein, L*a*b*-to-CMY and K-to-K transforms generate measured CMYK values, shown at 26. Module 28, takes the measured CMYK values generated by sensor LUT 34 and, using a set of CMY and K reference values, shown at 32 and 30 respectively, performs a CMY-to-CMY and K-to-K transform thereof to produce a set of Look-Up-Tables denoted CMY-to-CMY 3D LUT and K-to-K LUT. At 34, the CMY-to-CMY 3D LUTs and the K-to-K LUTs are used by a printer (not shown) to print a test target page. Printing of target can also be done by the DFE. Module 28 can reside in the DFE. The process is repeated, if required, with the CMYK values from module 28 being provided to modules 12 and 14 until the output colors of the printed test target page are acceptable.

Figure 2:
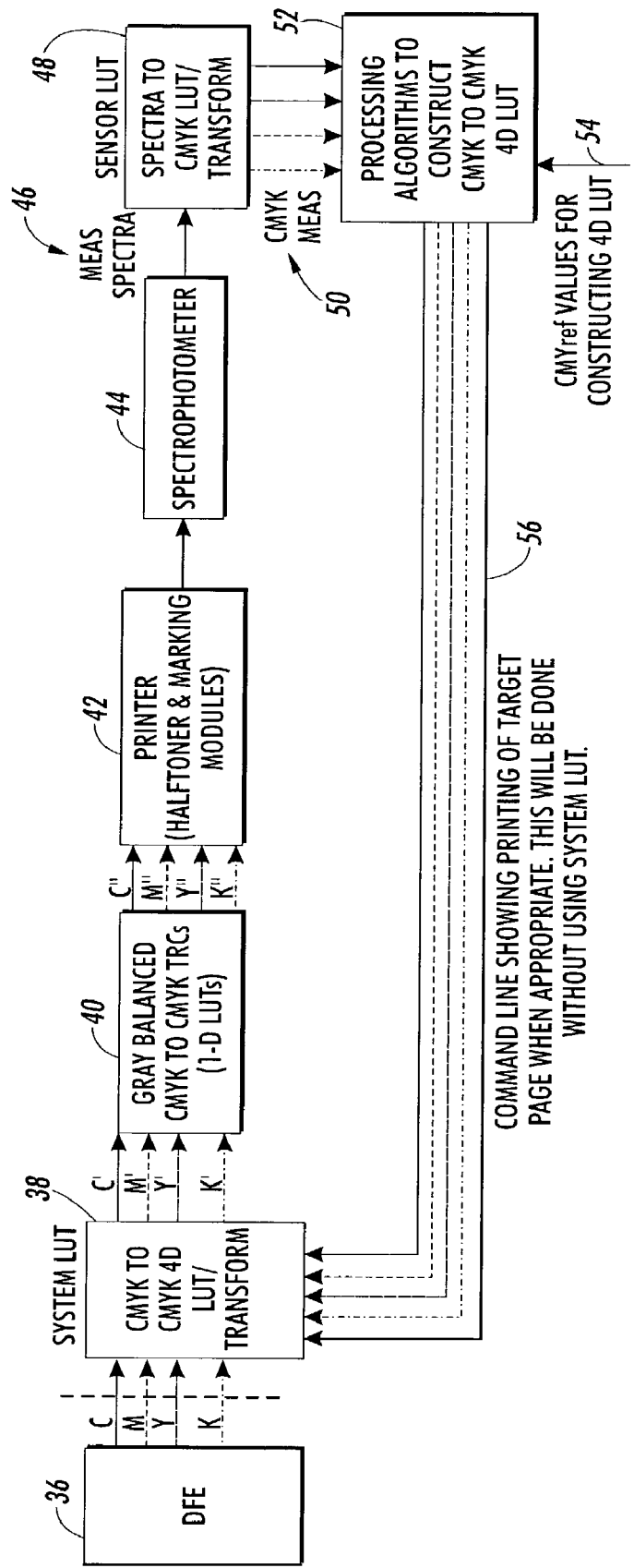
FIG. 2 illustrates use of system LUT [CMYK to CMYK 4D LUT] and sensor LUT [Spectrum to CMYK] as shown in the printer image path.

With reference now being made to FIG. 2, the processing block is used to construct the system LUT. For this example, it is assumed that the final system LUT for CMY to CMY 3D LUT contain $10^3$ data points and for K to K LUT contain 256 data points. In FIG. 2, the Digital Front End (DFE), 36, provides input CMYK values to system LUT 38, wherein a CMYK-to-CMYK 4D transform produces modified CMYK values, denoted as C'M'Y' and K' to block 40 wherein a Gray Balanced CMYK-to-CMYK TRCs process occurs providing modified CMYK values, denoted as C"M"Y" and K", to Halftoner and Marking module 42. The data generated therefrom is read by spectrophotometer 44 wherein the measured Spectra values, at 46, are provided to sensor LUT 48. Therein, a Spectra-to-CMYK transform generates measured CMYK values, at 50. Module 52, takes the measured CMYK values generated by sensor LUT 48 and, using a set of CMY reference values, at 54, performs a CMYK-to-CMYK 4D transform to produce a set of Look-Up-Tables denoted as CMYK-to-CMYK 4D LUT. At 56, the CMYK-to-CMYK 4D LUTs are used by a printer (not shown) to print a test target page. The process is repeated, if required, with the CMYK values from module 52 being provided to system LUT 38 until the output colors of the printed test target page are acceptable.

In accordance with the present invention, construction of the system LUT involves the following steps which can be grouped into two groups; (1) one-time processing steps done at the factory, and (2) implementation of field updates.

A full 3D forward map of the gray balanced printer is first measured by printing test patches, which contain CMY patches with no black (i.e., K set to zero). The output CMY, (i.e., output of the sensor LUT; Lab to CMY LUT), from the sensor is obtained for these test patches. For this example $10^3$ patches have been selected. C, M and Y in the test page are varied between 0 to 100% in 10 steps.

Some K patches by setting C=M=Y=0 in the test target (preferably around 256 patches) are printed and their K values (output of sensor LUT when C=M=Y=0) measured.

Using interpolation routines commonly found in the arts, (trilinear/tetrahedral) up-sample this measured forward map. Up-sampling may not be required depending on how well the printer is linearized with internal process controls and the gray balance system.

A dynamic optimization technique known in the arts is applied to determine critical nodes. These optimal critical nodes will minimize the measurements required for real-time updates (updates in the field). Alternatively sequential linear interpolation techniques described in *Sequential Linear Interpolation of Multi-Dimensional Functions*, Allebach et al., IEEE Trans on Image Processing, Vol. 6. No. 9, September 1997, incorporated herein by reference be made thereto, can also be applied to determine critical nodes. In that example, 100 critical nodes were identified. The CMY values of these critical nodes become the input patch values for the test target to be used for field updates.

A dynamic optimization technique known in the arts is then applied to generate optimal nodes for creating 1D system LUT for K separation. This is the inverse map of the forward LUT using either an Iteratively Clustered Interpolation Technique, as described in U.S. patent application Ser. No. 09/487,587, entitled: Iteratively clustered interpolation for geometrical interpolation of an irregularly spaced multidimensional color space", by Yao WANG et al., or a Moving Matrix Algorithm, as described in: *Refinement of printer transformations using weighted regression,* R. Balasubramanian, Proc. SPIE, Vol 2658, pp. 334-340, (1996) both of which are incorporated herein by reference.

One way of updating the system LUT in the field is by printing and measuring test patches created at all nodes of the system LUT (e.g., uniformly sampled CMY & K values with $10^3$ nodes). In other words, the number of patches required are chosen equal to as many nodes as there are in the system LUT. Depending upon the particular system, these nodes could be many and may become tedious and time consuming to measure and control. Hence, a sub sampled node set is preferred.

A test target with CMYK values of the critical nodes (output CMYK in the critical node LUT) is created using compression algorithms known in the arts.

The sub-sampled CMYK test target (for critical patches) are printed and measured with the sensor and its LUT output (CMY values for CMY patches and K values for K patches).

The up-sampled version of the inverse map is built using trilinear/tetrahedral interpolation and the measured CMYK values for the sub-sampled CMYK test target. In the present instance, the up-sampled inverse map will have an approximate size of $10^3$. This will contain the desired system LUT (CMY to CMY 3D LUT and K to K 1D LUT). This can be referred to as post-processing. This post-processing is performed every time updates are required. One skilled in this art would appreciate the fact that if all nodes are measured and controlled then up-sampling is not required.

Since the system LUT may contain a finite number of nodes, for colors outside these nodes, transformation is preferably achieved by using an interpolator.

The sensor LUT is required to extract CMY and K values from the measured spectra/L*a*b* values of the color patches. It is built preferably using high resolution such as $25^3$ CMY patches and about 1000 K-patches to minimize interpolation errors. CMYK test patch target are first printed and their L*a*b* values on a chosen reference printer are measured. Trilinear or tetrahedral interpolation is used to construct a uniformly sampled input for sensor LUT. Uniform sampling is not required to make this work. The same sensor LUT can be used in all other printers in the cluster. This LUT is treated static in all the print engines as compared to system LUT and hence no further updates are required in the field. Whereas, to keep the colors consistent across host of printers and have the DFEs see substantially identical CMYK values for the clustered printers, the system LUT needs to be constantly updated using control steps shown above.

Figure 3:
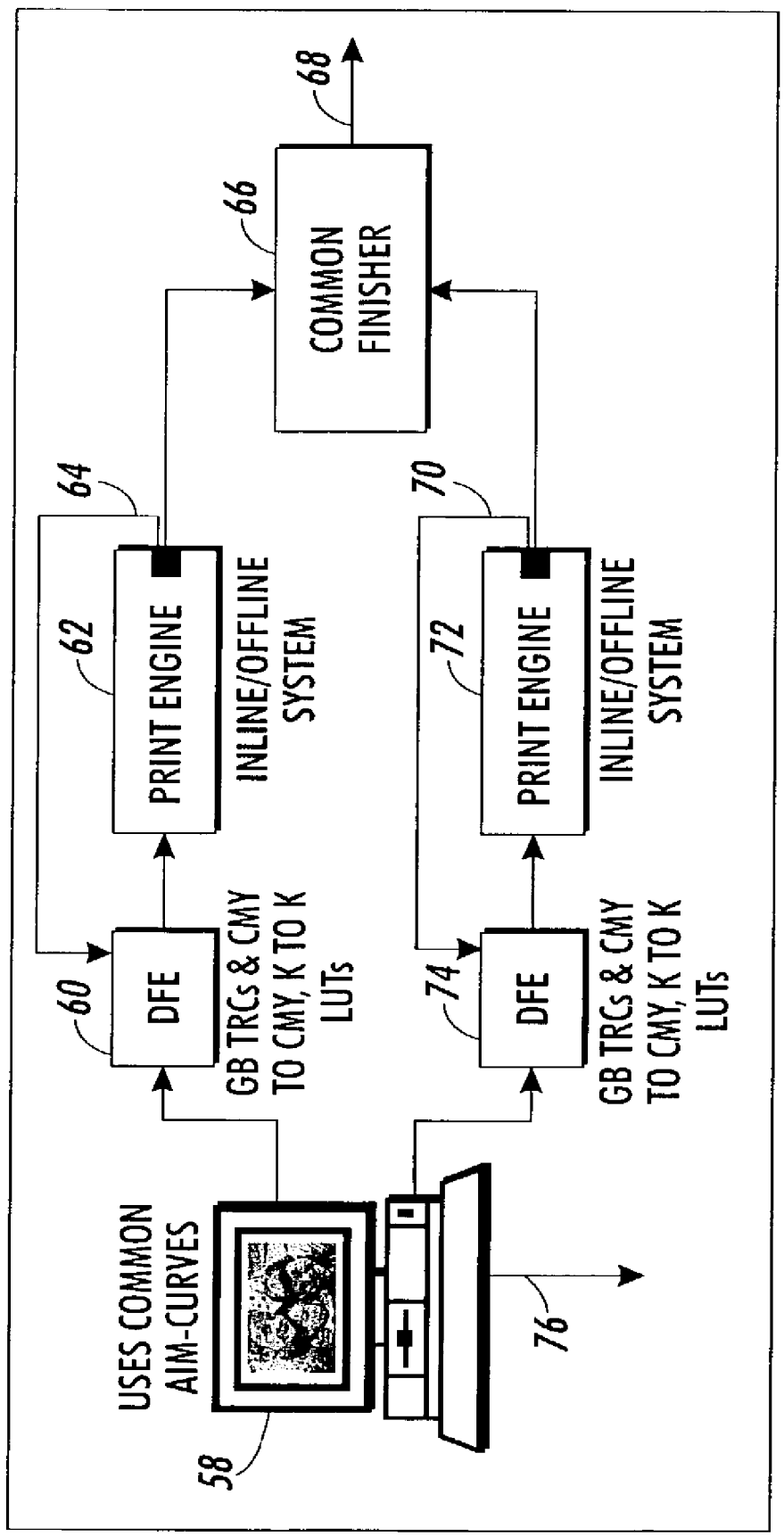
FIG. 3 shows a configuration for clustering print engines with controls shown by individual loops with two sensor on the output paper path with one in each print engine.
Figure 4:
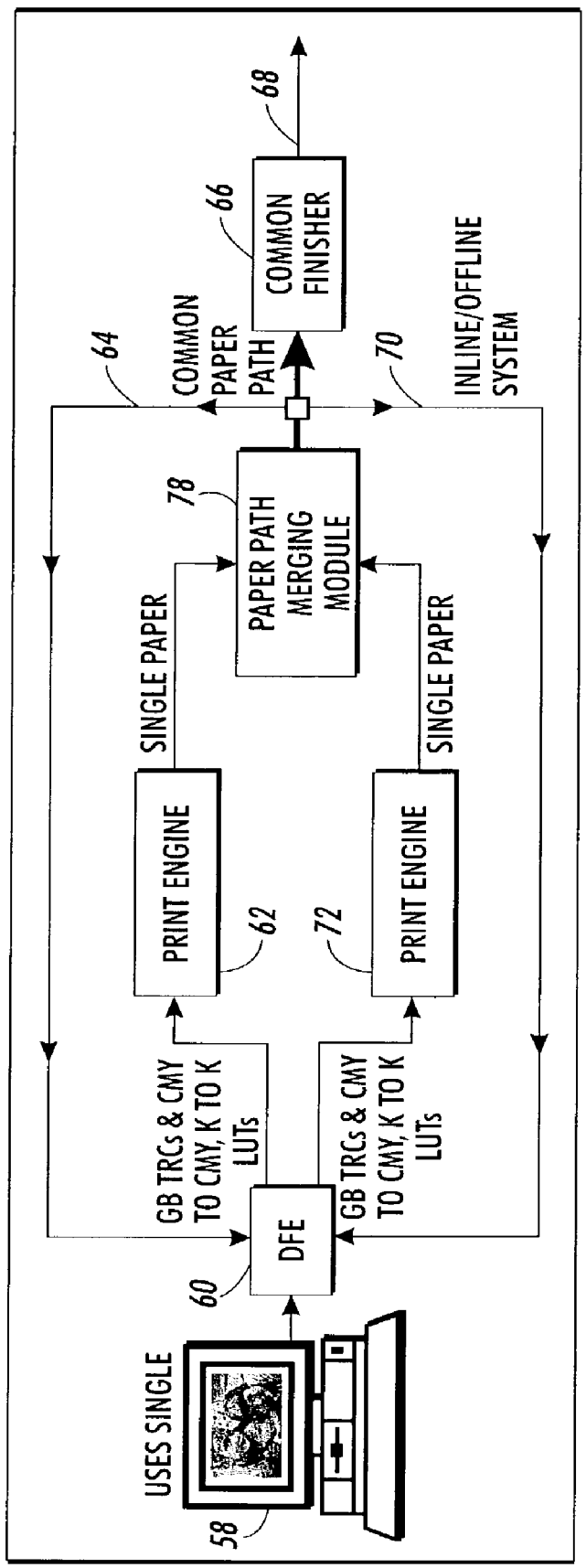
FIG. 4 shows a configuration for clustering print engines with controls shown by individual loops with one sensor in a common paper path.

FIGS. 3 and 4 show configurations for clustering print engines with controls shown by individual loops with two sensor on the output paper path one in each print engine shown in FIG. 3, and with one sensor in a common paper path shown in FIG. 4.

With reference now being made to FIG. 3, a user wishes to print a color picture which is on their computing system 58 by sending it to a clustered print environment comprising two printing devices each having their own DFEs, at 60 and 74 respectively, and print engines, at 62 and 72 respectively. These two print devices share common finisher 66 with the print being thereafter directed to output 68. The colors comprising the picture intended to be printed are processed using common AIM-curves and provided to the DFEs of said at least one printer. The DFEs, 60 and 74 of FIG. 3, embody therein all the processing in either of FIGS. 1 and 2. In FIG. 3, the iterative processes, shown at 64 and 70, associated with each print engine corresponds to what is happening in either of FIG. 1 or 2. As described in FIGS. 1 and 2, the gray-balanced TRCs and CMY-to-CMY and K-to-K LUTS adjust the color values comprising the colored pictured. These LUTS having been previously generated in accordance with the descriptions of either FIGS. 1 and 2. In either an online or off-line fashion, DFEs 60 and 74, iteratively adjust the colored picture, shown at 64 and 70 respectively. Alternatively, in either an online or off-line fashion, print engines 62 and 72, iteratively adjust the colored picture, shown at 64 and 70 respectively. The results therefrom being forwarded to common finisher 66 before being output at 68.

With reference now being made to FIG. 4, a user wishes to print a color picture which is on their computing system 58 by sending it to a clustered print environment comprising two printing devices sharing a common DFE 60 and having their own print engines, at 62 and 72 respectively. These print devices sharing paper merge module 78 and common finisher 66 with the print being thereafter directed to output 68. The colors comprising the picture intended to be printed are provided to DFE 60 embodying therein all the processing of either of FIGS. 1 and 2. In FIG. 4, the iterative processes, shown at 64 and 70, associated with each print engine corresponds to what is happening in either of FIG. 1 or 2. As described in FIGS. 1 and 2, the gray-balanced TRCs and CMY-to-CMY and K-to-K LUTS adjust the color values comprising the colored pictured. These LUTS having been previously generated in accordance with the descriptions of either FIGS. 1 and 2. In either an online or off-line fashion, DFEs 60 and 74, iteratively adjust the colored picture, at 64 and 70 respectively. Alternatively, in either an online or off-line fashion, print engines 62 and 72, iteratively adjust the colored picture, at 64 and 70 respectively. The results therefrom being forwarded to common finisher 66 before being output at 68.

By introducing the controls described above other core capabilities of the cluster printing (job splitting, load balancing, auto routing, job integrity etc.,) are not compromised. Dotted line between the controls loops in FIGS. 3 and 4 represent communication among printers.

Variations among the printers are compensated as control loop updates the system LUT. For instance a common variation seen among printers of the same family is variation in contrast due to different dynamic range of the printers (different Dmax/L*min). The sensors can measure the differences in dynamic range and the CMYK can be normalized to achieve a common dynamic range. Other differences in gamut may also be compensated for and incorporated in the CMYK to CMYK transform.

For an 8 bit system, a CMY to CMY 3D LUT would preferably use a 24-bit system whereas for a CMYK to CMYK 4D LUT would preferably use a 32-bit system. Generally, 17 Cube for 3D/4D LUTs are preferred. When reduced nodes are used in a look up table, a hardware or software interpolator based on trilinear/tetrahedral interpolation methods is preferable.

What is claimed is:

1. A method to provide standardized input CMYK values to an environment of clustered printers, comprising:
    (a) receiving a digital image in CMYK space;
    (b) transforming the digital image in CMYK space to a digital in C'M'Y'K' space using a CMYK to C'M'Y'K' look-up table;
    (c) processing the digital image in C'M'Y'K' space;
    (d) rendering the processed digital image on a recording medium;
    (e) scanning the rendered image to create a rendered digital image in CMYK space;
    (f) comparing reference CMYK values with the rendered digital image in CMYK space;
    (g) creating a new CMYK to C'M'Y'K' look-up table based upon the comparison of the reference CMYK values with the rendered digital image in CMYK space; and
    (h) replacing the CMYK to C'M'Y'K' look-up table with the new CMYK to C'M'Y'K' look-up table.

2. The method, as claimed in claim 1, wherein scanning the rendered image creates a digital image in L*a*b* space and the digital image in L*a*b* space is converted to the rendered digital image in CMYK space.

3. The method, as claimed in claim 2, wherein the digital image in L*a*b* space is converted to the rendered digital image in CMYK space using a L*a*b* to CMY look-up table and L* to K one-dimensional look-up table.

4. The method, as claimed in claim 1 wherein the received digital image contains CMYK patches.

5. The method, as claimed in claim 1, wherein the CMYK to C'M'Y'K' look-up table comprises a three-dimensional CMY to C'M'Y' look-up table and a one-dimensional K to K' look-up table.

6. The method, as claimed in claim 1 wherein the CMYK to C'M'Y'K' look-up table comprises a four-dimensional CMYK to C'M'Y'K' look-up table.

7. The method, as claimed in claim 1, wherein the received digital image contains CMY patches with no black.

8. A print system, having a clustered configuration of printers with a common paper path, and providing standardized input CMYK values so that one printer produces substantially identical output colors for substantially identical input CMYK values, comprising:
    a digital front end to receive and pre-process a digital image in CMYK space;
    a CMYK to C'M'Y'K' look-up table to transform the digital image in CMYK space to a digital image in C'M'Y'K' space;
    a processing module to process the digital image in C'M'Y'K' space;
    a print engine to render the processed digital on a recording medium;
    a scanning device to scan the rendered image and to create a rendered digital image in CMYK space; and
    a comparison circuit to compare reference CMYK values with the rendered digital image in CMYK space and to create a new CMYK to C'M'Y'K' look-up table based upon the comparison of the reference CMYK values with the rendered digital image in CMYK space;
    said comparison circuit causing the CMYK to C'M'Y'K' look-up table to be replaced with the new CMYK to C'M'Y'K' look-up table.

9. The system, as claimed in claim 8, wherein said scanning device creates a digital image in L*a*b* space and the digital image in L*a*b* space is converted to the rendered digital image in CMYK space.

10. The system, as claimed in claim 9, said scanning device comprises a L*a*b* to CMY look-up table and a L* to K one-dimensional look-up table.

11. The system, as claimed in claim 8, wherein said CMYK to C'M'Y'K' look-up table comprises a three-dimensional CMY to C'M'Y' look-up table and a one-dimensional K to K' look-up table.

12. The system, as claimed in claim 8, said CMYK to C'M'Y'K' look-up table comprises a four-dimensional CMYK to C'M'Y'K' look-up table.

13. The system, as claimed in claim 8, wherein the received digital image contains CMY patches with no black.

14. The system, as claimed in claim 8, the the received digital image contains CMYK patches.

* * * * *